US006793225B2

(12) United States Patent
Svartz et al.

(10) Patent No.: US 6,793,225 B2
(45) Date of Patent: Sep. 21, 2004

(54) TORQUE ROD BRACKET

(75) Inventors: Bjorn O. Svartz, Jamestown, NC (US); Darris White, Superior, CO (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/214,041

(22) Filed: Aug. 7, 2002

(65) Prior Publication Data

US 2004/0026886 A1 Feb. 12, 2004

(51) Int. Cl.[7] ............................................. B60G 21/055
(52) U.S. Cl. ................................................. 280/124.107
(58) Field of Search .................. 280/124.107, 124.106, 280/124.11, 5.506, 5.507, 5.511; 224/545, 546, 547

(56) References Cited

U.S. PATENT DOCUMENTS

| 2,810,587 A | 10/1957 | Boughner |
| 3,434,707 A | 3/1969 | Raidel |
| 3,510,149 A | 5/1970 | Raidel |
| 3,707,298 A | 12/1972 | Henry et al. |
| 3,754,774 A | 8/1973 | Nelson |
| 3,883,153 A | 5/1975 | Singh et al. |
| 4,245,852 A | 1/1981 | Lie et al. |
| 4,334,696 A | 6/1982 | Bergstrom |
| 4,453,738 A * | 6/1984 | Murata et al. ......... 280/124.108 |
| 4,506,910 A | 3/1985 | Bierens |
| 4,541,653 A | 9/1985 | Raidel |
| 4,566,719 A | 1/1986 | Van Denberg |
| 4,705,294 A | 11/1987 | Raidel |
| 4,763,923 A | 8/1988 | Raidel |
| 4,781,364 A * | 11/1988 | Finn et al. ................... 267/260 |
| 4,911,417 A | 3/1990 | Short |
| 4,927,173 A | 5/1990 | Clifton, Jr. |
| 4,998,749 A | 3/1991 | Bockewitz |
| 5,112,078 A | 5/1992 | Galazin et al. |
| 5,375,871 A | 12/1994 | Mitchell et al. |
| 5,476,285 A | 12/1995 | Dickerson |
| 5,690,353 A | 11/1997 | Vandenberg |
| 5,785,345 A | 7/1998 | Barlas et al. |
| 5,836,599 A * | 11/1998 | Rein de Vlugt ...... 280/124.128 |
| 5,971,425 A | 10/1999 | Dinsley et al. |
| 6,073,946 A | 6/2000 | Richardson |
| 6,073,947 A | 6/2000 | Gottschalk et al. |
| 6,135,470 A | 10/2000 | Dudding |
| 6,135,483 A | 10/2000 | Metz |
| 6,209,895 B1 | 4/2001 | Mueller et al. |
| 6,257,597 B1 | 7/2001 | Galazin |

* cited by examiner

*Primary Examiner*—Faye M. Fleming
(74) *Attorney, Agent, or Firm*—Watts Hoffmann Co., L.P.A.

(57) ABSTRACT

A bracket formed from a single piece of sheet material for use in suspension of a vehicle for inhibiting relative lateral movement between and axle and a frame of the vehicle. The bracket includes a first portion bent to form a sleeve for insertion of a first fastener used to mount a first end of a torque rod. A second portion of the sheet material is bent to form a second sleeve for insertion of a second fastener used to mount the first end of the torque rod. A base portion is formed from the sheet material for mounting the bracket to the axle of the vehicle. The base portion maintains the first sleeve and the second sleeve in a spaced apart relationship for mounting an end of the torque rod.

11 Claims, 4 Drawing Sheets

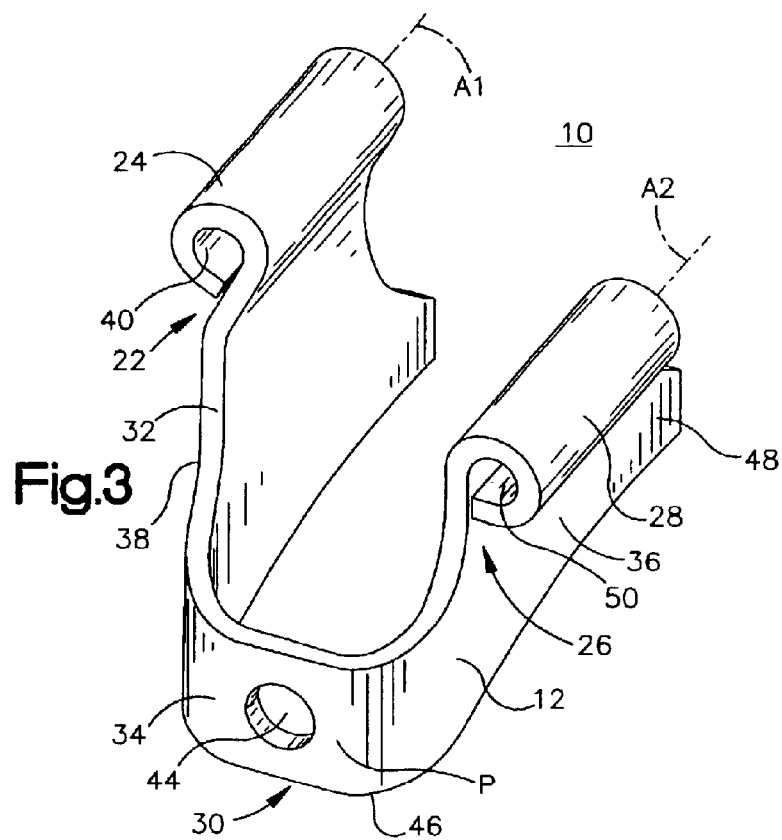
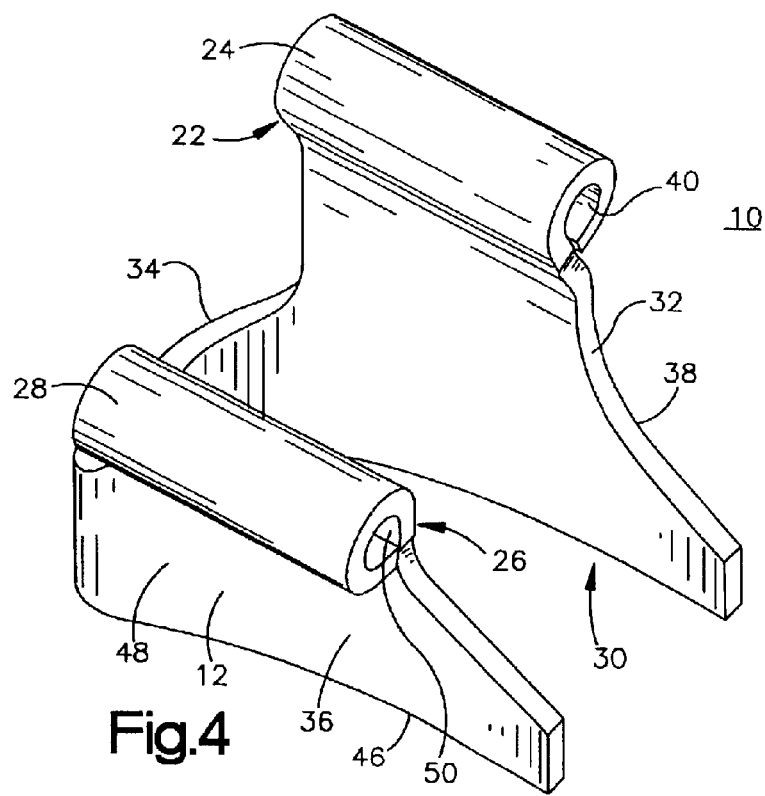

TORQUE ROD BRACKET

TECHNICAL FIELD

The present invention relates to an over the highway truck or tractor suspension and, more particularly, the present invention relates to a torque rod bracket for use in conjunction with a torque rod in the construction of a truck or tractor suspension for preventing relative lateral movement between an axle and a frame of the truck or tractor.

BACKGROUND ART

Weight is one of the most important factors in the design of an over the highway truck or tractor. Vehicle operators are often paid by the ton/mile. Highway regulations set maximum weights for loaded trucks and tractors. As a result, the lighter the over the highway truck or tractor is, the most profitable it is. Even a small decrease in the weight of an over the highway truck or tractor greatly increases the profitability of the truck or tractor over its life.

In over the highway trucks and tractors, it is common to use torque rods to prevent relative lateral movement between the truck or tractor frame and the axle. An axle end of the torque rod is connected to the axle and a frame end of the torque rod is connected to the frame. The ends of the torque rod are constructed such that the torque rod can pivot with respect to the axle and the frame.

A prior art torque rod bracket 2 used to mount the toque rod to the axle is illustrated in FIG. 2. Since the torque rod bracket is welded to the axle, the material the torque rod bracket is made from must have very good weld properties. As a result, the illustrated prior art torque rod bracket is made from cast steel rather than much less expensive cast iron. Difficulties that are inherent in casting steel add a significant amount of cost to the prior art cast steel bracket, used to mount the first torque rod end to the axle was made from cast sheet. The cast bracket required an additional sheet metal bracket to allow welding of the cast bracket to the axle. In addition, considerable weight was added to the vehicle by use of the cast steel torque rod bracket.

What is needed is a torque rod bracket that is lighter, facilitates welding to the axle and is less expensive than traditional cast steel torque rod brackets. Use of lighter torque rod brackets in tractors and trucks increases the load that can be carried. As a result, the profitability of the vehicle is increased. Making a bracket from a piece of steel sheet material is much less expensive than casting a bracket in steel.

DISCLOSURE OF INVENTION

The present invention concerns a bracket formed from a single piece of sheet material for use in a suspension of a vehicle with a torque rod for inhibiting relative lateral movement between an axle and a frame of the vehicle. A first portion of the sheet material is bent to form a first sleeve for insertion of a first fastener used to mount a first end of the torque rod. A second portion of the sheet material is bent to form a second sleeve for insertion of a second fastener used to mount the first end of the torque rod. The sheet material is bent to form a base portion for mounting the bracket to the axle of the vehicle. The base portion maintains the sleeves in a spaced apart relationship. In one embodiment of the invention, the base defines a C-shaped mating surface for attachment of the torque rod bracket to the axle.

In one embodiment, the torque rod bracket made from a single piece of sheet material is used in an apparatus for use in the suspension of a vehicle for inhibiting relative lateral movement between the axle and the frame of the vehicle. The bracket is used with a torque rod having a first end portion and a second end portion. The first end portion of the torque rod is connected to the bracket by a first fastener that extends into the first sleeve of the torque rod bracket and a second fastener that extends into the second sleeve of the torque rod bracket. The first end of the torque rod bracket is configured to allow rotation of the torque rod with respect to the torque rod bracket. The second end of the torque rod bracket is connected to the vehicle frame. The second end of the torque rod bracket is configured to allow rotation of the torque rod with respect to the frame. The torque rod inhibits relative lateral movement between the axle and the frame of the vehicle.

These and other advantages of the present invention will become apparent upon reading the following detailed description in view of the drawings.

BRIEF DESCRIPTION OF DRAWINGS

FIG. 3 is a perspective view of a torque rod bracket constructed in accordance with the present invention;

FIG. 4 is a perspective view of a torque rod bracket constructed in accordance with the present invention;

BEST MODE FOR CARRYING OUT THE INVENTION

Figure 1:
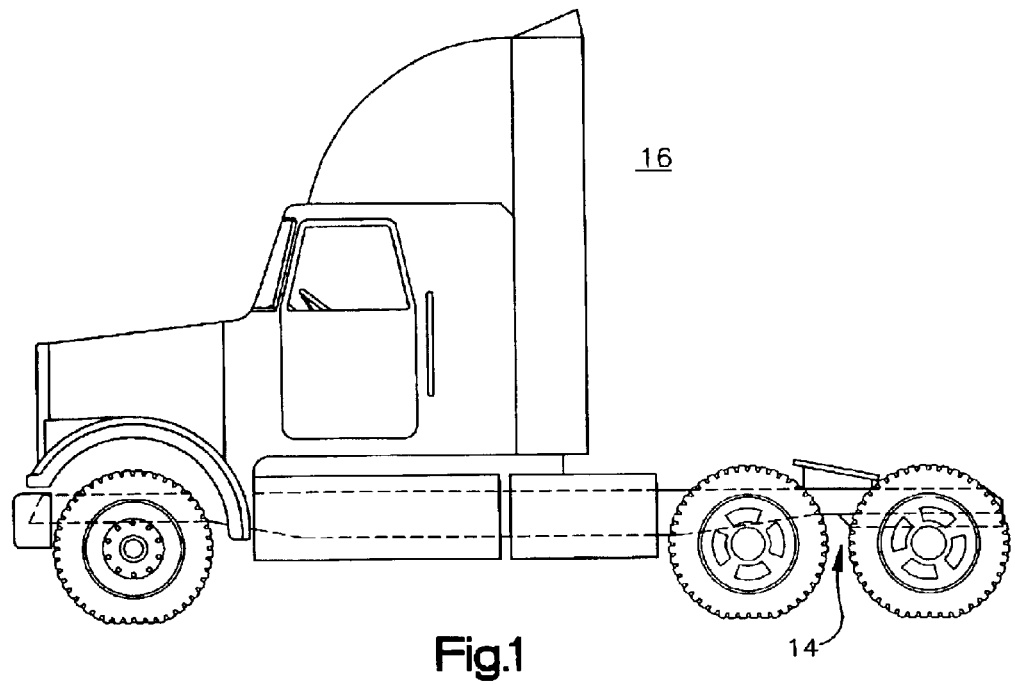
FIG. 1 is a side elevational view of a tractor including the novel and improved torque rod bracket of the present invention.
Figure 2:
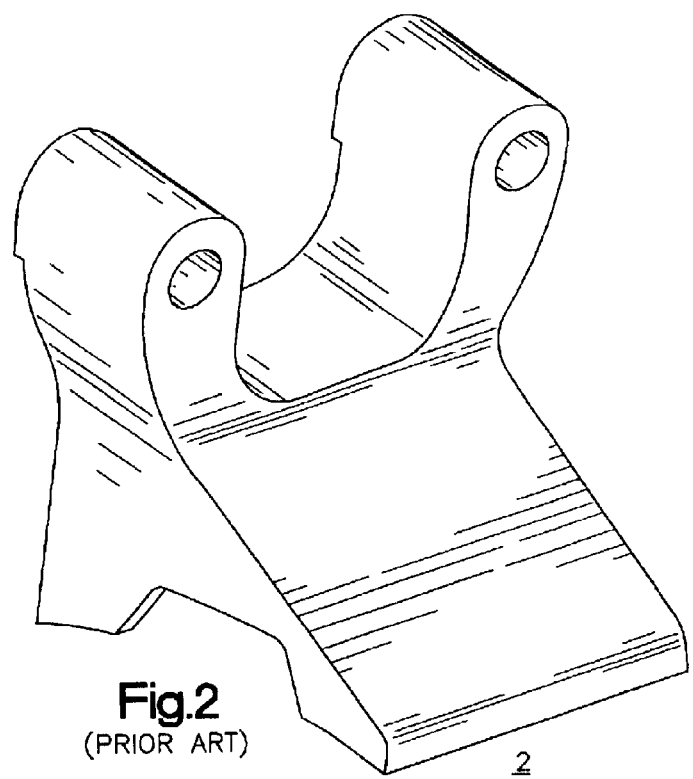
FIG. 2 is a perspective view of a prior art cast torque rod bracket.

The present disclosure is directed to a bracket 10 formed from a single piece of sheet material 12 for use in a suspension 14 of a vehicle 16 for inhibiting relative lateral movement between an axle 18 and a frame 20 of the vehicle. Referring to FIGS. 3 and 4, the bracket 10 includes a first portion 22 that is bent to form a first sleeve 24. A second portion 26 of the sheet material 12 is bent to form a second sleeve 28. The sheet material 12 is bent to form a base portion 30 that supports the first and second sleeves 24, 28. The base portion 30 maintains the first and second sleeves 24, 28 in a spaced apart relationship.

In the illustrated embodiment, the base portion 30 includes first, second and third walls 32, 34, 36. The first wall 32 extends from the first sleeve 24. The first portion 22 of sheet material 12 is bent to form the first sleeve 24 slightly outside of an outer surface 38 of the first wall 32. The outer surface 38 of the first wall 32 transitions into an inner surface 40 of the first sleeve 24. The second wall extends at approximately 90° from the first wall 32. In the illustrated embodiment, a plane P defined by a surface of the second wall 34 intersects an axis A1 of the first sleeve 24 and an axis A2 of the second sleeve 28. In the illustrated embodiment, the second wall 34 includes an opening 44.

The third wall 36 extends at approximately 90° from the second wall 34. The first, second and third walls include edges that define a C-shaped surface 46 for mounting the bracket 10 to the axle 18. The second sleeve 28 extends from the third wall 36. The second portion 26 of the sheet material 12 is bent to form the second sleeve outward of an outer surface 48 of the third wall 36. The outer surface 48 transitions to an inner surface 50 of the second sleeve 28.

In the illustrated embodiment, the first sleeve 24 is positioned farther away from the C-shaped surface 46 of the base 30 than the second sleeve 28. As a result, the mounting flanges 62a, 62b of the first end portion 54 of the torque rod 52 are disposed at an angle to the surface of the axle 18 to which the bracket 10 is mounted.

Figure 5:
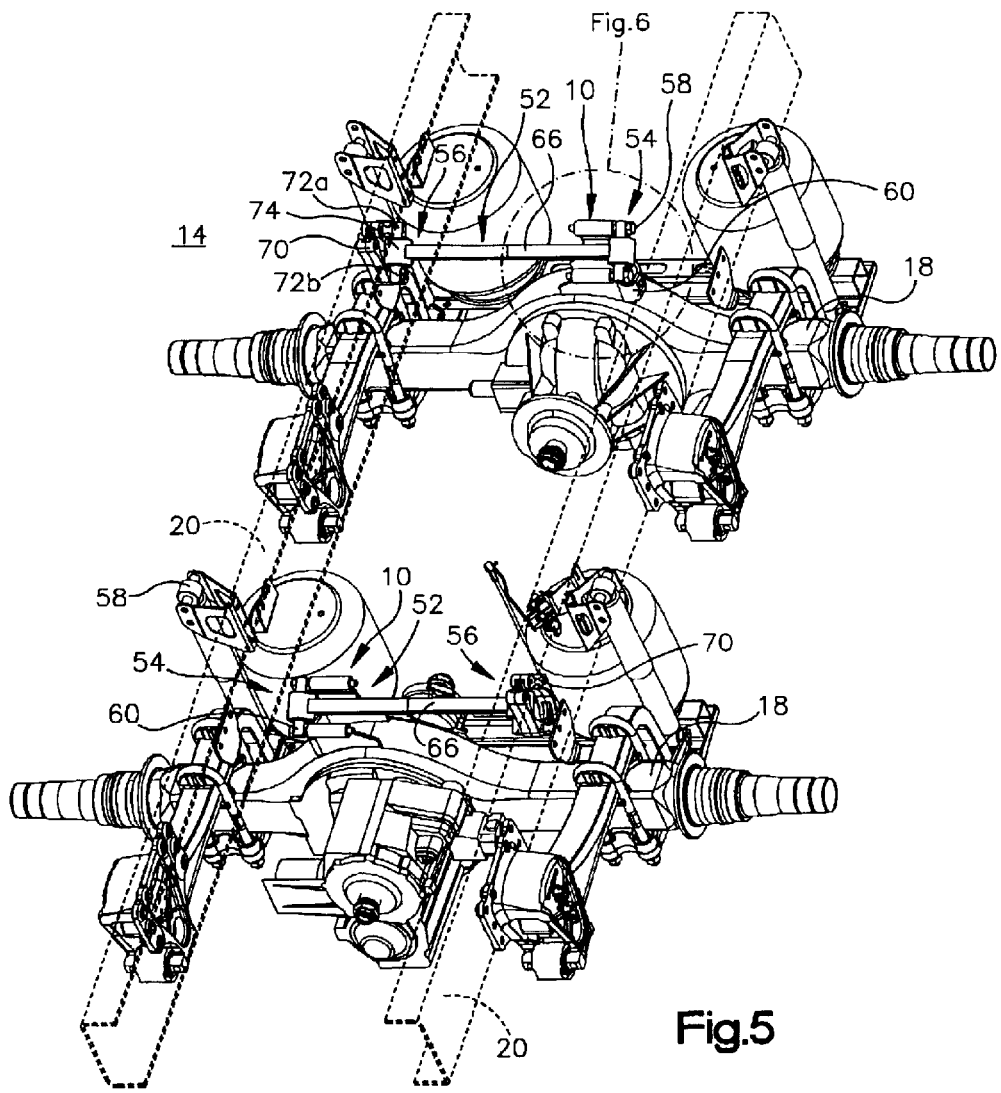
FIG. 5 is a perspective view of a torque rod bracket constructed in accordance with the present invention mounted to axles of a tandem axle vehicle; and, FIG. 6 is an enlarged perspective view of a torque rod bracket constructed in accordance with the present invention mounted to an axle of a truck or tractor.
Figure 6:
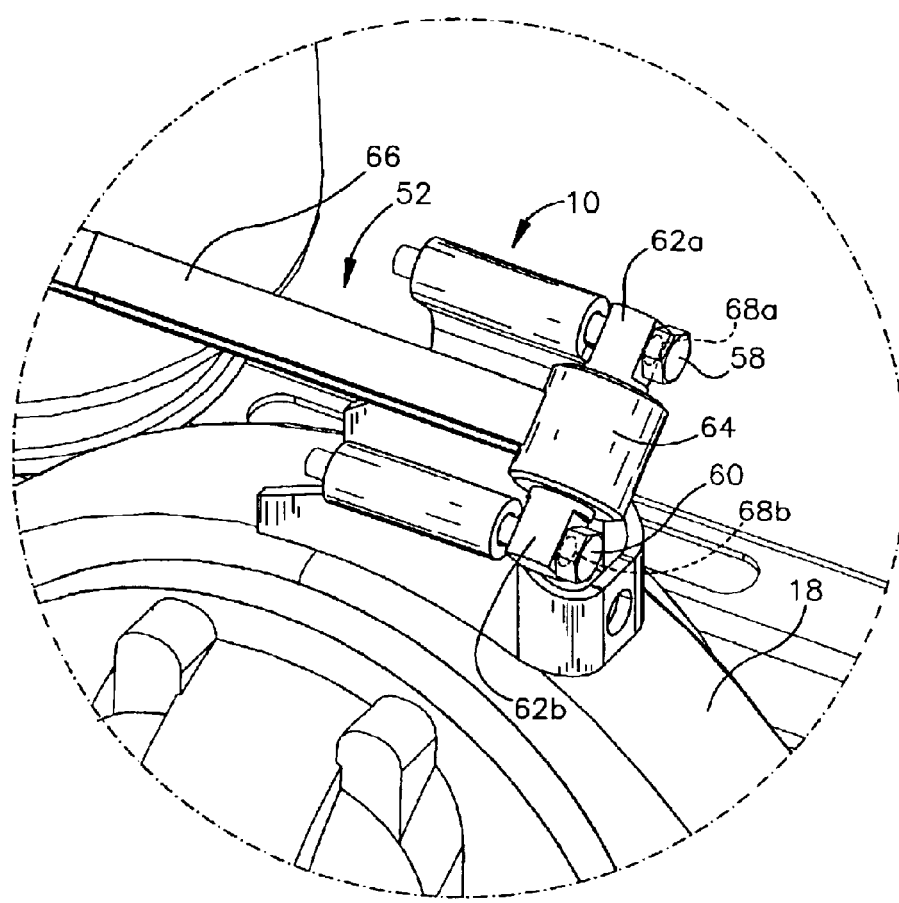

Referring to FIGS. 5 and 6, the bracket 10 is used to mount a torque rod 52 in a suspension 14. The illustrated suspension 14 is a tandem axle suspension. However, it should be readily apparent to those skilled in the art that the illustrated bracket 10 could be used in a single axle suspension as well.

The bracket 10 is connected to the axle 18. In the illustrated embodiment, the bracket 10 is welded to the axle 18. It should be readily apparent that the bracket 10 may be fixed to the axle 18 by any other conventional fastening means. The torque rod 52 is designed to inhibit relative lateral movement between the axle 18 and the frame 20 of the vehicle 16. The torque rod 52 includes first and second end portions 54, 56. The first end portion 54 is connected to the bracket 10 by a first fastener 58 that extends into the first sleeve 24 and a second fastener 60 that extends into the second sleeve 28 of the bracket 10.

The first end portion 54 of the torque rod 52 is configured to allow rotation of the torque rod 52 relative to the bracket 10. Referring to FIG. 6, the first end portion 54 includes a pair of mounting flanges 62a, 62b that extend into a knuckle 64. The mounting flanges 62a, 62b are rotatable with respect to the knuckle 64. A rod portion 66 of the torque rod 52 extends from the knuckle 64. The mounting flanges 62a, 62b include mounting holes 68a, 68b that are aligned with openings in the first and second sleeves 24, 28. The first and second fasteners 58, 60 extends through mounting holes 68a, 68b into the sleeves 24, 28 to connect the first end portion 54 of the torque rod 52 to the bracket 10.

The second end portion 56 of the torque rod 52 is connected to the vehicle frame 20 by a frame mounting bracket 70 that is connected to the frame 20. The second end portion 56 of the torque rod 52 also includes first and second mounting flanges 72a, 72b that extend from a knuckle 74. The knuckle 74 is connected to the rod portion 66 of the torque rod 52. The mounting flanges 72a, 72b are rotatable with respect to the knuckle 74, allowing the torque rod 52 to rotate with respect to the frame 20. Fasteners extend through holes in the mounting flanges 72a, 72b and into the frame mounting bracket 70 to connect the second end portion 56 to the frame 20.

The torque rod 52 inhibits relative lateral movement between an axle 18 and a frame 20 of the vehicle 16. The torque rod 52 is constrained by the bracket 10 and bracket 70 to rotation of the first end portion 54 with respect to the axle 18 and rotation of the second end portion 56 with respect to the frame 20.

It should be apparent to those skilled in the art that the lateral forces applied to the torque rod 52 are absorbed by the sheet material 12 along the axises A1, A2 of the first and second sleeves 24, 28. The result is a very strong bracket, since the lateral forces are applied along the width of the first and third walls 32, 36.

In the exemplary embodiment, the torque rod bracket is constructed from a weldable steel plate. A bracket 10 made from a single piece of sheet material in accordance with the present invention reduces the cost of the torque rod bracket compared to traditional torque rod brackets and reduces the weight of the truck or tractor.

Although the present has been described with a degree of particularity, it is the intent that the invention include all modifications and alterations falling within the spirit and scope of the following claims.

We claim:

1. In a heavy duty vehicle suspension having a torque rod rotatably connected to an torque rod bracket welded to an axle and rotatably connected to a frame, said torque rod inhibiting relative lateral movement between the axle and the frame wherein the improvement comprises forming said bracket from a single piece of sheet material such that the formed bracket includes:

a) a first portion bent to form a first sleeve for insertion of a first fastener used to mount a first end of a torque rod;
   b) a second portion bent to form a second sleeve for insertion of a second fastener used to mount said first end of said torque rod; and
   c) a bent base portion for mounting said bracket to said axle that maintains said first sleeve and said second sleeve in a spaced apart relationship.

2. The suspension of claim 1 wherein said base portion includes a first wall that supports said first portion, a second wall extending from said first wall and a third wall extending from said second wall that supports said second portion.

3. The suspension of claim 1 wherein a plane defined by said second wall intersects an axis of said first sleeve and an axis of said second sleeve.

4. The suspension of claim 1 wherein said base defines a "C" shaped mating surface for attachment to said axle.

5. The suspension of claim 1 wherein said bracket is formed from a single piece of steel sheet material.

6. A method of forming a torque rod bracket from a single piece of sheet material for use in a suspension of a heavy duty vehicle for inhibiting relative lateral movement between an axle and a frame of the vehicle, comprising:

a) bending a first portion to of said piece of sheet material to form a first sleeve for insertion of a first fastener used to mount a first end of a torque rod;
   b) bending a second portion of said piece of sheet material to form a second sleeve for insertion of a second fastener used to mount said first end of said torque rod; and
   c) bending a third portion of said piece of sheet material to form a base that maintains said first sleeve and said second sleeve in a spaced apart relationship.

7. A suspension of a heavy duty vehicle for inhibiting relative lateral movement between an axle and a frame of the vehicle, comprising:

a) a bracket formed from a single piece of sheet material that includes a first portion bent to form a first sleeve, a second portion bent to form a second sleeve and a bent base portion connected to said axle that maintains said first sleeve and said second sleeve in a spaced apart relationship; and
   b) a torque rod having a first end portion and a second end portion, said first end portion connected to said bracket by a first fastener that extends into said first sleeve and a second fastener that extends into said second sleeve, said first end portion being configured to allow rotation of said torque rod relative to said bracket, said second end portion of said torque rod being connected to said vehicle frame and being configured to allow rotation of said torque rod with respect to said frame.

8. The bracket of claim 7 wherein said base portion includes a first wall extending from said first portion, a second wall extending from said second portion and a third wall that maintains said first and second walls in a spaced apart relationship.

9. The bracket of claim 8 wherein a plane defined by said third wall intersects an axis of said first sleeve and an axis of said second sleeve.

10. The bracket of claim 7 wherein said base defines a "C" shaped mating surface for welding to said axle.

11. In a heavy duty vehicle suspension having a torque rod rotatably connected to an a torque rod bracket welded to an axle and rotatably connected to a frame, said torque rod inhibiting relative lateral movement between the axle and the frame wherein the improvement comprises forming said bracket from a single piece of sheet material such that the formed bracket includes:

a) a first sleeve portion for insertion of a first fastener used to mount a first end of a torque rod;

b) a first side wall extending from said first sleeve;

c) a second side wall extending at approximately 90 degrees from said first side wall;

d) a third side wall extending at approximately 90 degrees from said second side wall, said first, second and third sidewalls including edges that define a "C" shaped surface for mounting said bracket to said axle; and e) a second sleeve portion extending from said third side wall for insertion of a second fastener used to mount said first end of said torque rod.

* * * * *